(12) United States Patent
Xu et al.

(10) Patent No.: US 10,321,491 B2
(45) Date of Patent: Jun. 11, 2019

(54) METHOD AND APPARATUS FOR SUPPORTING LOCAL GATEWAY SERVICE FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/515,560

(22) PCT Filed: Nov. 2, 2015

(86) PCT No.: PCT/KR2015/011655
§ 371 (c)(1),
(2) Date: Mar. 29, 2017

(87) PCT Pub. No.: WO2016/076564
PCT Pub. Date: May 19, 2016

(65) Prior Publication Data
US 2017/0231019 A1    Aug. 10, 2017

Related U.S. Application Data

(60) Provisional application No. 62/078,951, filed on Nov. 12, 2014.

(51) Int. Cl.
*H04B 7/06* (2006.01)
*H04B 7/26* (2006.01)
(Continued)

(52) U.S. Cl.
CPC .......... *H04W 76/10* (2018.02); *H04B 7/0626* (2013.01); *H04B 7/26* (2013.01);
(Continued)

(58) Field of Classification Search
CPC ........ H04B 7/0626; H04B 7/26; H04J 11/00; H04L 1/0026; H04W 28/02; H04W 76/02; H04W 76/10; H04W 88/08; H04W 92/20
See application file for complete search history.

(56) References Cited

U.S. PATENT DOCUMENTS

2015/0029999 A1* 1/2015 Horn ............... H04W 36/22
370/331
2015/0282152 A1* 10/2015 Wang ............... H04L 5/0092
370/329
(Continued)

FOREIGN PATENT DOCUMENTS

WO    2014112803    7/2014

OTHER PUBLICATIONS

3rd Generation Partnership Project (3GPP), "Technical Specification Group Radio Access Network; Study on Small Cell enhancements for E-UTRA and E-UTRAN; Higher Layer Aspects (Release 12)," 3GPP TR 36.842 V12.0.0, Dec. 2013, 71 pages.
(Continued)

*Primary Examiner* — Kashif Siddiqui
(74) *Attorney, Agent, or Firm* — Lee, Hong, Degerman, Kang & Waimey

(57) ABSTRACT

A method and apparatus for supporting a local gateway (L-GW) service in a wireless communication system is provided. When an L-GW is co-located with a master evolved NodeB (MeNB) in dual connectivity, a secondary evolved NodeB (SeNB) in dual connectivity receives a request message including information on a specific E-UTRAN radio access bearer (E-RAB), which is served by a L-GW, from a master evolved NodeB (MeNB) in dual connectivity which has the L-GW, decides to transmit data
(Continued)

via a X2 interface instead of a S1-U interface for the specific E-RAB, and transmits a response message to the MeNB.

15 Claims, 14 Drawing Sheets

(51) Int. Cl.

| | | |
|---|---|---|
| H04L 1/00 | (2006.01) | |
| H04J 11/00 | (2006.01) | |
| H04W 28/02 | (2009.01) | |
| H04W 28/06 | (2009.01) | |
| H04W 76/10 | (2018.01) | |
| H04W 76/11 | (2018.01) | |
| H04W 76/15 | (2018.01) | |
| H04W 88/08 | (2009.01) | |
| H04W 88/16 | (2009.01) | |
| H04W 92/20 | (2009.01) | |

(52) U.S. Cl.
CPC ............ *H04J 11/00* (2013.01); *H04L 1/0026* (2013.01); *H04W 28/02* (2013.01); *H04W 76/15* (2018.02); *H04W 88/08* (2013.01); *H04W 92/20* (2013.01); *H04W 28/06* (2013.01); *H04W 76/11* (2018.02); *H04W 88/16* (2013.01)

(56) References Cited

U.S. PATENT DOCUMENTS

| | | | | |
|---|---|---|---|---|
| 2016/0112945 A1* | 4/2016 | Chen | ................... | H04W 28/085 |
| | | | | 370/338 |
| 2016/0135174 A1* | 5/2016 | Lee | ....................... | H04W 76/10 |
| | | | | 370/329 |
| 2016/0157155 A1* | 6/2016 | Chiba | ................ | H04W 76/041 |
| | | | | 455/436 |

OTHER PUBLICATIONS

Alcatel-Lucent, "LIPA/SIPTO Support in dual connectivity (SA2 point 9)," 3GPP TSG-RAN WG3 Meeting #83, R3-140256, Feb. 2014, 7 pages.
Samsung, "Motivation for new WI Proposal on Dual Connectivity Enhancement for LTE," 3GPP TSG RAN #64, RP-140951, Jun. 2014, 5 pages.
Samsung, "New Work Item Proposal on Dual Connectivity Enhancement for LTE," 3GPP TSG-RAN Meeting #65, RP-141331, Sep. 2014, 8 pages.
Samsung, "Motivation for new WI Proposal on Dual Connectivity Enhancement for LTE," 3GPP TSG-RAN #65, RP-141333, Sep. 2014, 5 pages.
PCT International Application No. PCT/KR2015/011655, Written Opinion of the International Searching Authority dated Feb. 15, 2016, 2 pages.

* cited by examiner

METHOD AND APPARATUS FOR SUPPORTING LOCAL GATEWAY SERVICE FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/011655, filed on Nov. 2, 2015, which claims the benefit of U.S. Provisional Application No. 62/078,951, filed on Nov. 12, 2014, the contents of which are all hereby incorporated by reference herein in its entirety.

BACKGROUND OF THE INVENTION

Field of the Invention

The present invention relates to wireless communications, and more particularly, to a method and apparatus for supporting local gateway (L-GW) service for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

The LTE network architecture is designed for the centralized gateways where the operator typically only has one or a few gateways. That architecture makes sense for the Internet access because the number of Internet peering points is limited. Different architecture, however, may be needed for the small base stations to allow access to the local content. The local access would be practical for accessing corporate intranet information or accessing a home network over LTE radio.

A method for supporting a local gateway (L-GW) service for dual connectivity may be required.

SUMMARY OF THE INVENTION

The present invention provides a method and apparatus for supporting local gateway (L-GW) service for dual connectivity in a wireless communication system. The present invention provides a method and apparatus for indicating that an L-GW is used for a specific E-UTRAN radio access bearer (E-RAB), when an L-GW is co-located with a master evolved NodeB (MeNB) in dual connectivity.

In an aspect, a method for supporting, by a secondary evolved NodeB (SeNB) in dual connectivity, a local gateway (L-GW) service in a wireless communication system is provided. The method includes receiving a request message including information on a specific E-UTRAN radio access bearer (E-RAB), which is served by a L-GW, from a master evolved NodeB (MeNB) in dual connectivity which has the L-GW, deciding to transmit data via a X2 interface instead of a S1-U interface for the specific E-RAB, and transmitting a response message to the MeNB.

In another aspect, a secondary evolved NodeB (SeNB) in dual connectivity is provided. The SeNB includes a memory, a transceiver, and a processor coupled to the memory and the transceiver, and configured to control the transceiver to receive a request message including information on a specific E-UTRAN radio access bearer (E-RAB), which is served by a local gateway (L-GW), from a master evolved NodeB (MeNB) in dual connectivity which has the L-GW, decide to transmit data via a X2 interface instead of a S1-U interface for the specific E-RAB, and control the transceiver to transmit a response message to the MeNB.

An L-GW can be supported efficiently in dual connectivity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
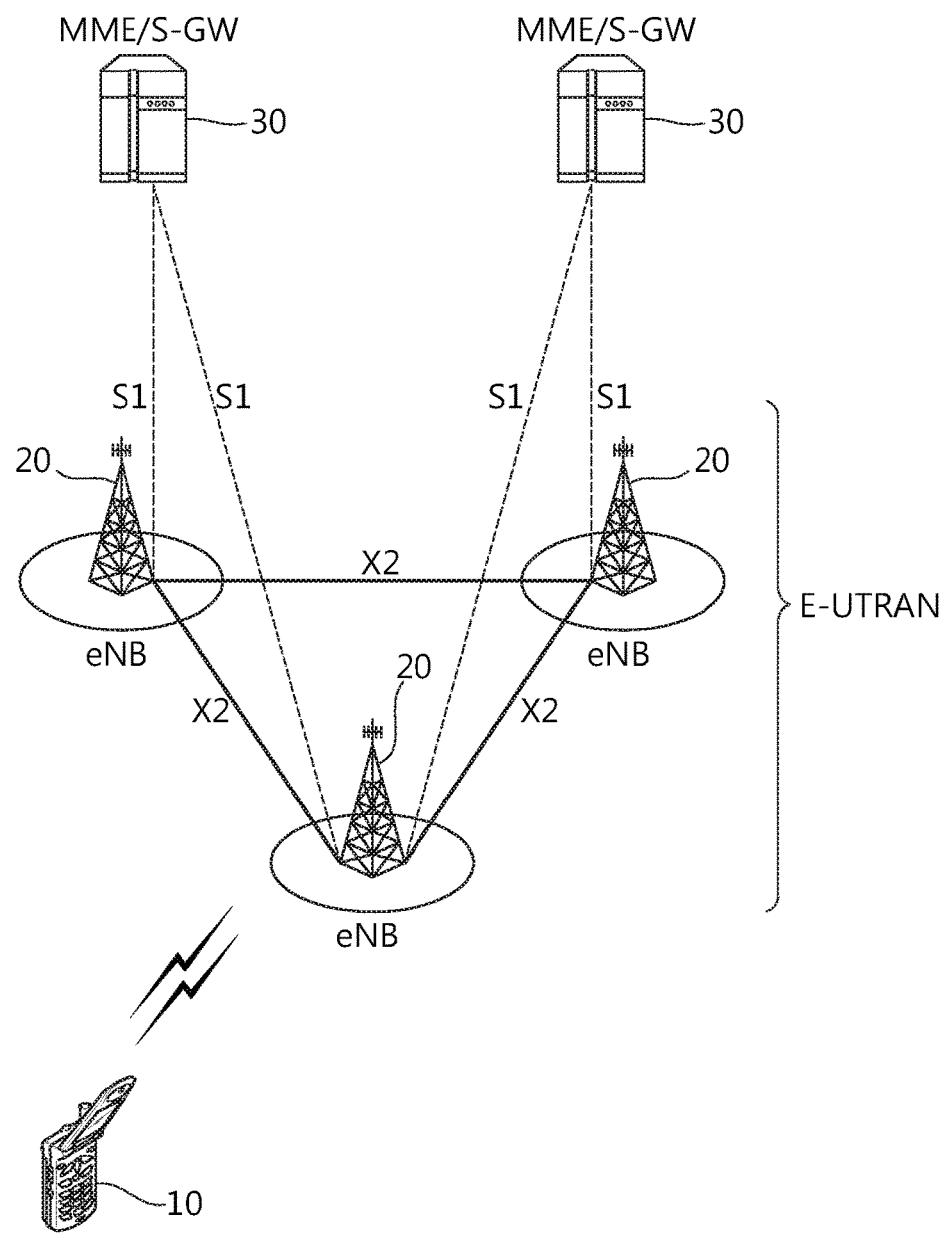
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
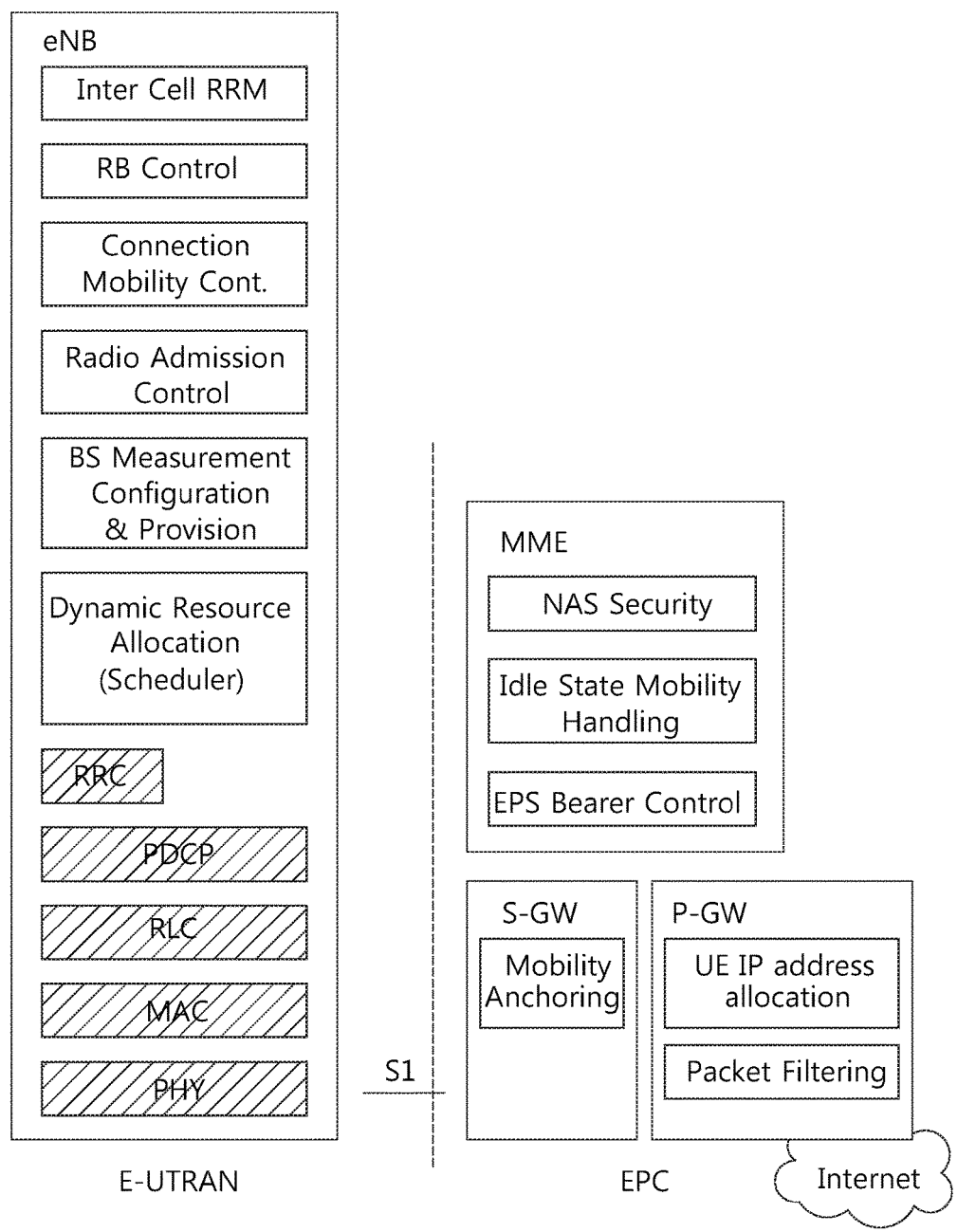
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
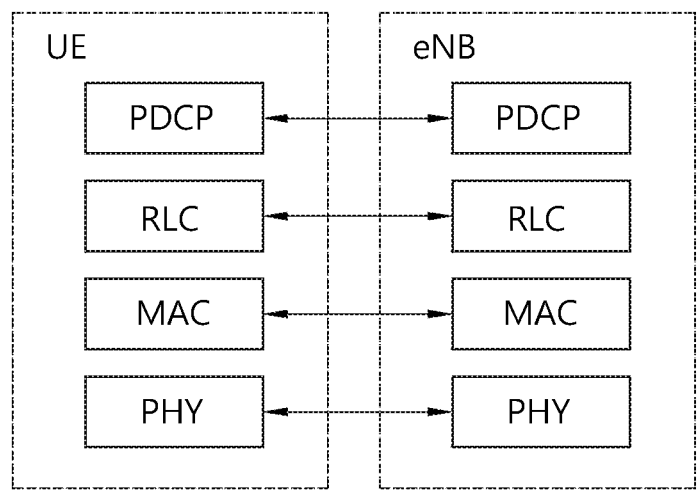
FIG. 3 shows a block diagram of a user plane protocol stack of an LTE system.
Figure 4:
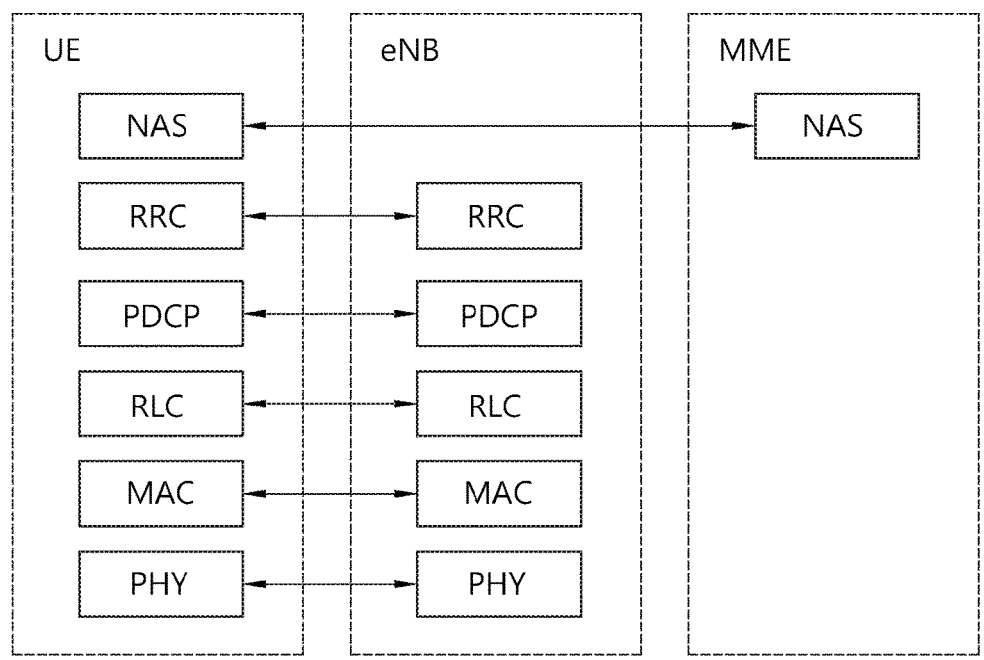
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
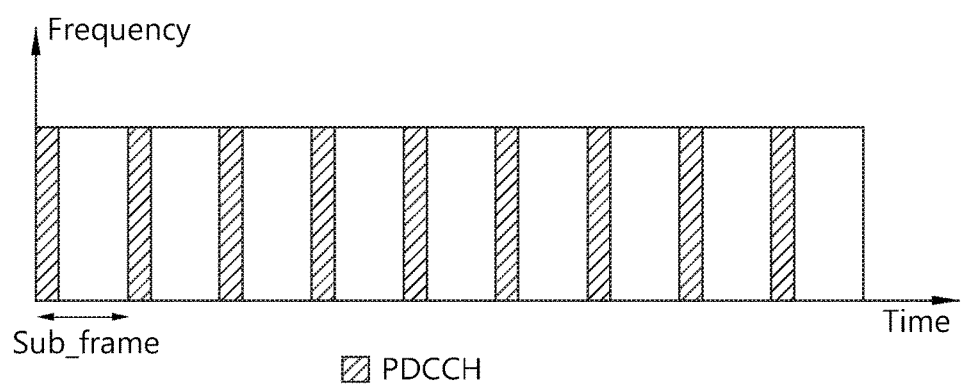
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013-12). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
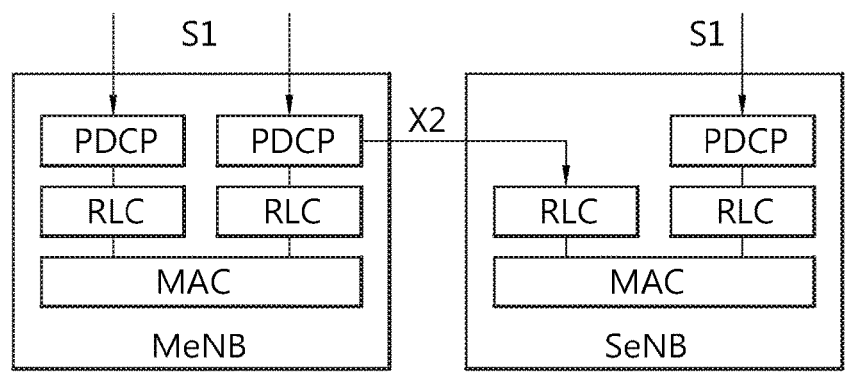
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
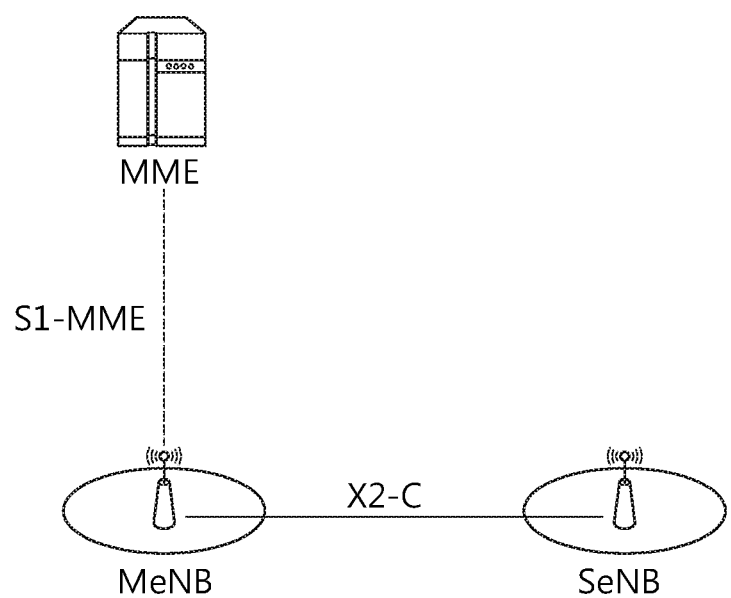
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
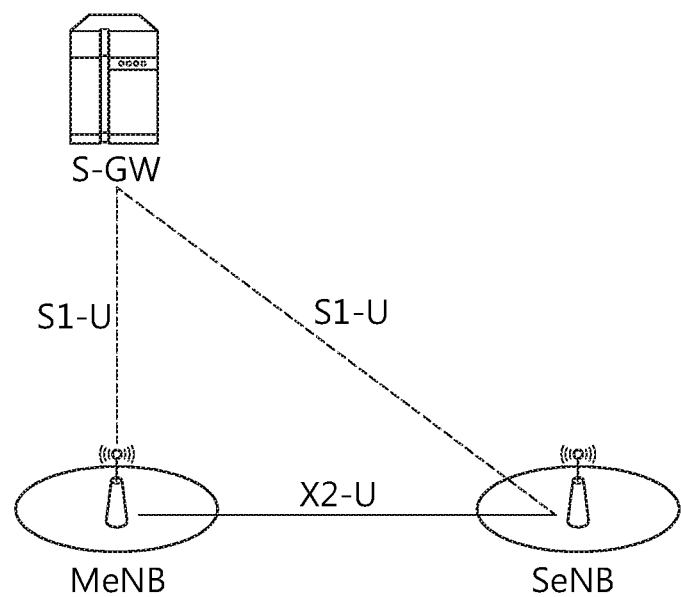
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
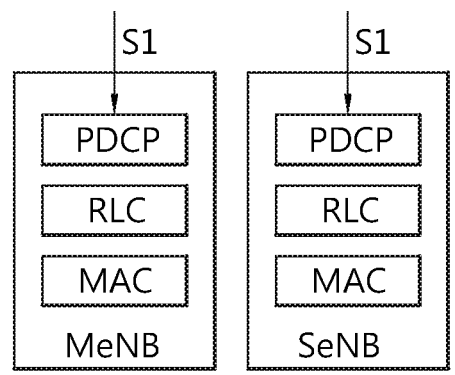
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split). U-plane architecture for dual connectivity shown in FIG. 9 may be called "Architecture 1A".

Figure 10:
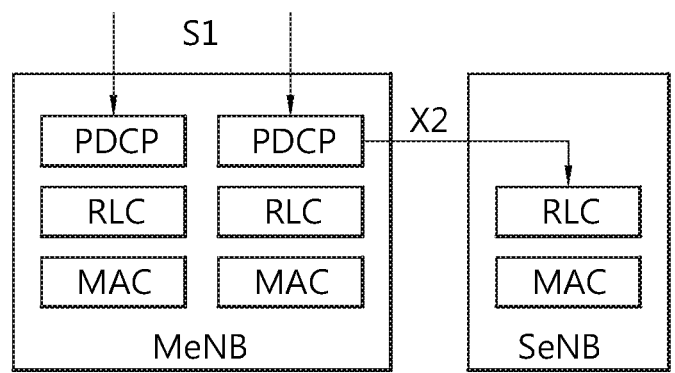
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers. U-plane architecture for dual connectivity shown in FIG. 10 may be called "Architecture 3C".

Local IP access (LIPA) function enables a UE to access directly enterprise or residential network without user plane data travelling first to the centralized gateway. LIPA functionality would make sense together with home eNB (HeNB). A local gateway (L-GW) is co-located with a femto for the local access. The L-GW supports of internal direct user plane path with the HeNB.

Dual connectivity was introduced in 3GPP LTE rel-12. Further, LIPA/selected IP traffic offload (SIPTO) was introduced in the past releases. A potential architecture of 3GPP LTE rel-13 is that the L-GW is supported for dual connectivity.

Figure 11:
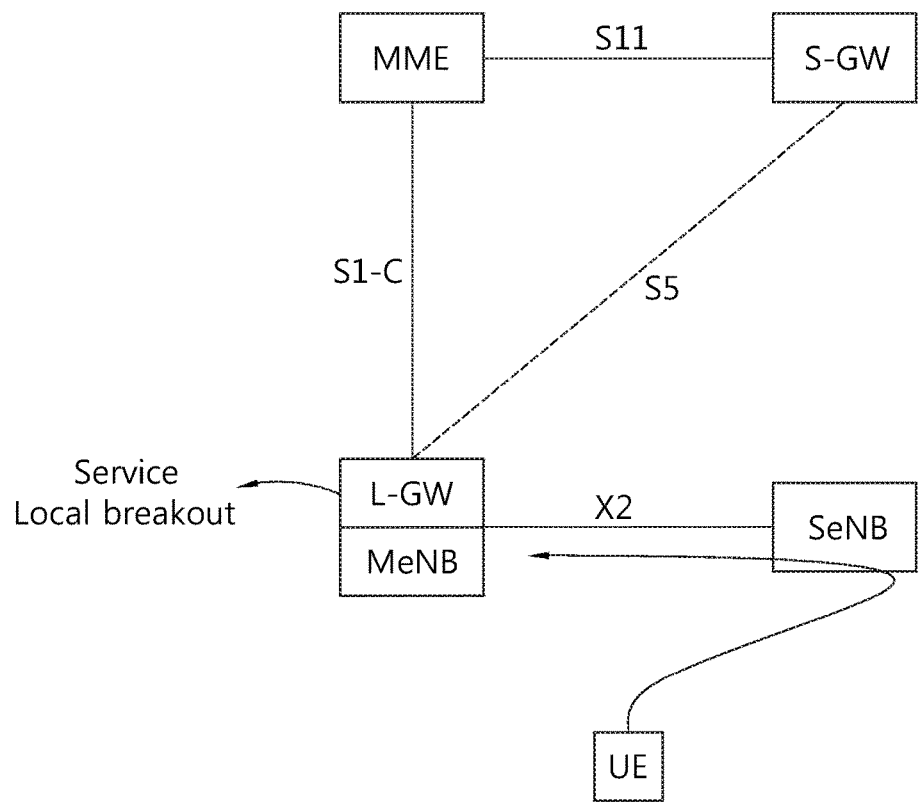
FIG. 11 shows an example of architecture of dual connectivity in which an L-GW locates together with a MeNB.

FIG. 11 shows an example of architecture of dual connectivity in which an L-GW locates together with a MeNB. Referring to FIG. 11, service local breakout may be performed at the L-GW. Since the L-GW co-locates with the MeNB, X2-U interface between the MeNB and SeNB may be used to transfer user data instead of S1-U interface between the SeNB and S-GW. However in this case, how the E-UTRAN radio access bearer (E-RAB) can be served by the L-GW has not yet defined clearly.

In order to solve the problem described above, a method for supporting L-GW service for dual connectivity when the L-GW is co-located with the MeNB, may be proposed according to an embodiment of the present invention.

Figure 12:
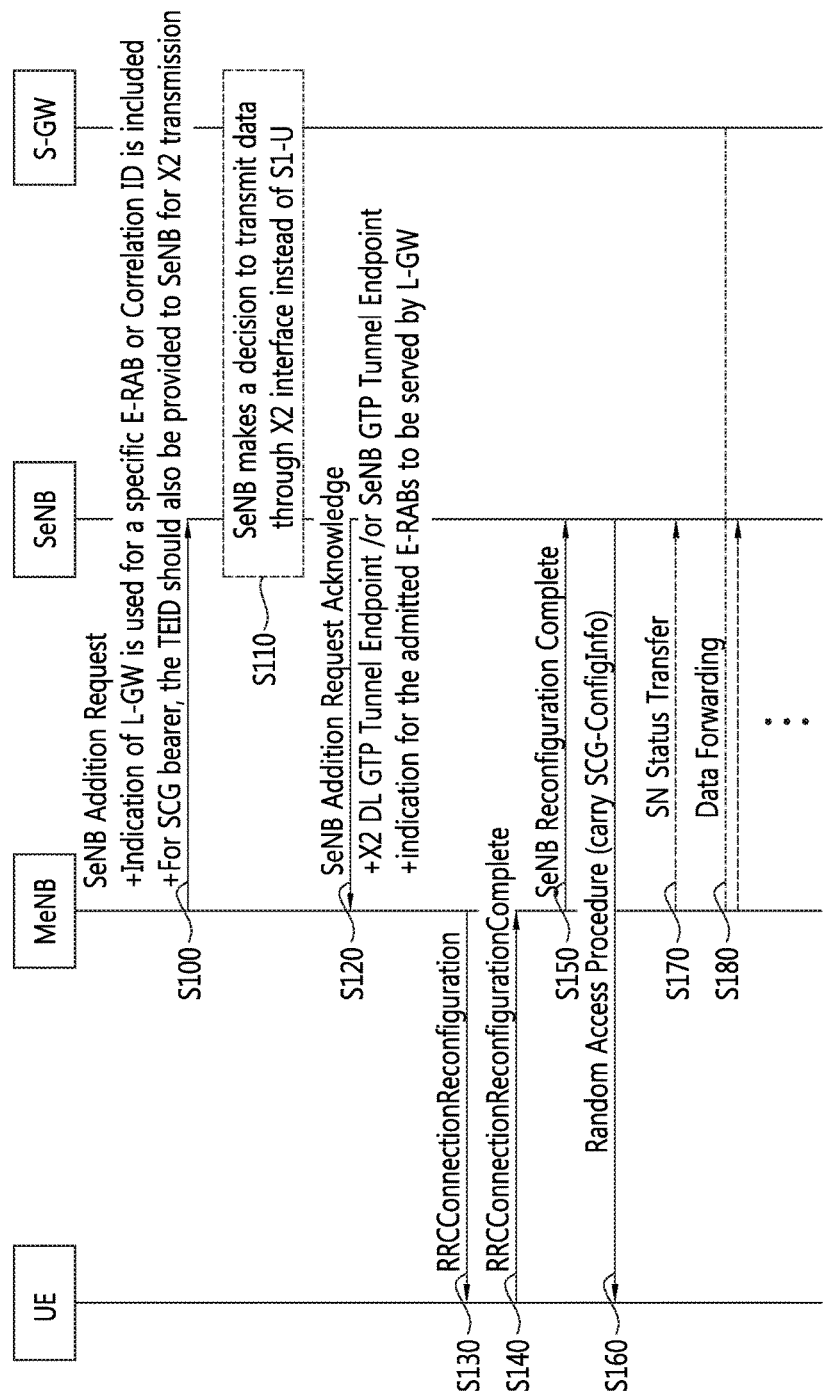
FIG. 12 show a method for supporting L-GW service for dual connectivity according to an embodiment of the present invention.

FIG. 12 show a method for supporting L-GW service for dual connectivity according to an embodiment of the present invention.

In step S100, the MeNB decides to request the SeNB to allocate radio resources for a specific E-RAB, and accordingly, transmits the SeNB Addition Request message to the SeNB. The SeNB Addition Request message may indicate characteristics of the specific E-RAB, which may include E-RAB parameters, transport network layer (TNL) address information corresponding to the UP option. If the corresponding specific E-RAB is served by the L-GW, the SeNB Addition Request message may include at least one of an indication that L-GW is to be used for the corresponding specific E-RAB, correlation identifier (ID), or the MeNB GPRS tunneling protocol (GTP) tunnel endpoint ID (TEID). The MeNB GTP TEID may be used for the corresponding specific E-RAB in order to use X2 interface for data transmission, especially for SCG bearer option.

Upon receiving the SeNB Addition Request message, in step S110, the SeNB makes a decision to transmit data through X2 interface instead of S1-U interface for the specific E-RAB.

Upon deciding to transmit data through X2 interface for the specific E-RAB, in step S120, the SeNB gives a response to the MeNB for the SeNB Addition Request message by transmitting the SeNB Addition Request Acknowledge message to the MeNB. If the corresponding specific E-RAB is served by the L-GW, the SeNB Addition Request Acknowledge message may include at least one of X2 DL GTP tunnel endpoint/or SeNB GTP tunnel endpoint, or an indication for the admitted E-RABs to be served by the L-GW.

In step S130, the MeNB transmit the RRCConnectionReconfiguration message to the UE. In step S140, the UE transmit the RRCConnectionReconfigurationComplete message to the MeNB. In step S150, the MeNB transmit the SeNB Reconfiguration Complete message to the SeNB. In step S160, the UE and the SeNB performs the random access procedure. In step S170, the MeNB may transmit the SN Status Transfer message to the SeNB. In step S180, data forwarding may be performed.

Figure 13:
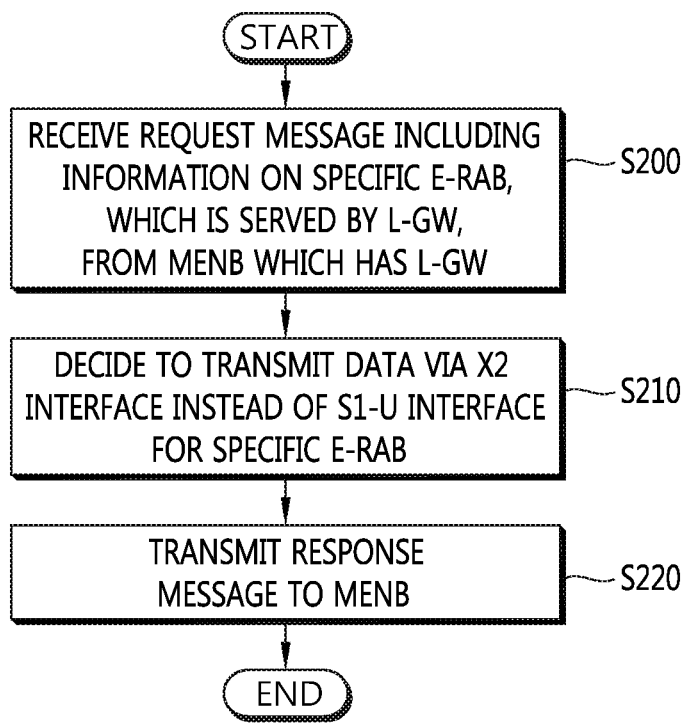
FIG. 13 show a method for supporting L-GW service for dual connectivity according to another embodiment of the present invention.

FIG. 13 show a method for supporting L-GW service for dual connectivity according to another embodiment of the present invention.

In step S200, the SeNB in dual connectivity receives a request message including information on a specific E-RAB, which is served by an L-GW, from a MeNB in dual connectivity which has the L-GW. The request message may request the SeNB to allocate radio resource for the specific E-RAB. The request message may further include at least one of an indication that the L-GW is to be used for the specific E-RAB, a correlation ID, or a MeNB GTP TEID. The correlation ID may include a SIPTO correlation ID or a LIPA correlation ID. The request message may be a SeNB Addition Request message or a SeNB Modification Request message. The information on the specific E-RAB may include at least one of E-RAB parameters for the specific E-RAB, or TNL address information for the specific E-RAB.

In step S210, the SeNB decides to transmit data via an X2 interface instead of a S1-U interface for the specific E-RAB.

In step S210, the SeNB transmits a response message to the MeNB. The response message may include at least one of a X2 DL GTP tunnel endpoint, a SeNB GTP tunnel endpoint, or an indication for the specific E-RAB to be served by the L-GW. The response message may be a SeNB Addition Request Acknowledge message or a SeNB Modification Request Acknowledge message.

Figure 14:
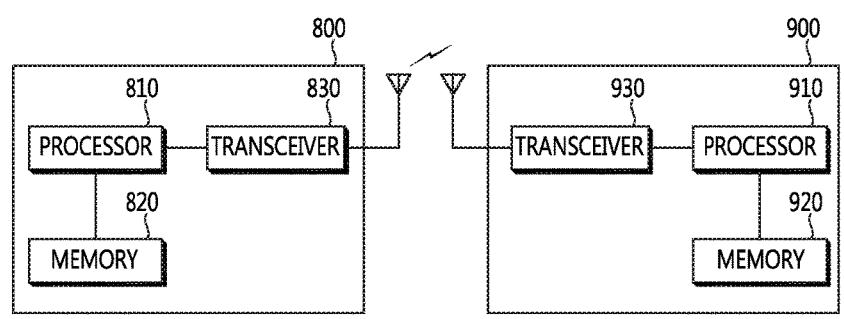
FIG. 14 shows a wireless communication system to implement an embodiment of the present invention.

FIG. 14 shows a wireless communication system to implement an embodiment of the present invention.

A MeNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A SeNB 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a secondary evolved NodeB (SeNB) in dual connectivity in a wireless communication system, the method comprising:
receiving a request message including information on a specific evolved universal mobile telecommunication system (UMTS) terrestrial radio access network (E-UTRAN) radio access bearer (E-RAB), which is served by a local gateway (L-GW), from a master evolved NodeB (MeNB) in dual connectivity which is collocated with the L-GW;
deciding to transmit data via a X2 interface instead of a S1-U interface for the specific E-RAB; and
transmitting a response message to the MeNB.

2. The method of claim 1, wherein the request message requests the SeNB to allocate radio resource for the specific E-RAB.

3. The method of claim 1, wherein the request message further includes at least one of an indication that the L-GW is to be used for the specific E-RAB, a correlation identifier (ID), or a MeNB general packet radio service (GPRS) tunneling protocol (GTP) tunnel endpoint ID (TEID).

4. The method of claim 3, wherein the correlation ID includes a selected Internet protocol (IP) traffic offload (SIPTO) correlation ID or a local IP (LIPA) correlation ID.

5. The method of claim 1, wherein the request message is a SeNB Addition Request message or a SeNB Modification Request message.

6. The method of claim 1, wherein the information on the specific E-RAB includes at least one of E-RAB parameters for the specific E-RAB, or transport network layer (TNL) address information for the specific E-RAB.

7. The method of claim 1, wherein the response message includes at least one of a X2 downlink (DL) general packet radio service (GPRS) tunneling protocol (GTP) tunnel endpoint, a SeNB GTP tunnel endpoint, or an indication for the specific E-RAB to be served by the L-GW.

8. The method of claim 1, wherein the response message is a SeNB Addition Request Acknowledge message or a SeNB Modification Request Acknowledge message.

9. A secondary evolved NodeB (SeNB) in dual connectivity comprising:
- a memory;
- a transceiver; and
- a processor coupled to the memory and the transceiver, and configured to:
  - control the transceiver to receive a request message including information on a specific evolved universal mobile telecommunication system (UMTS) terrestrial radio access network (E-UTRAN) radio access bearer (E-RAB), which is served by a local gateway (L-GW), from a master evolved NodeB (MeNB) in dual connectivity which is collocated with the L-GW;
  - decide to transmit data via a X2 interface instead of a S1-U interface for the specific E-RAB; and
  - control the transceiver to transmit a response message to the MeNB.

10. The SeNB of claim 9, wherein the request message requests the SeNB to allocate radio resource for the specific E-RAB.

11. The SeNB of claim 9, wherein the request message further includes at least one of an indication that the L-GW is to be used for the specific E-RAB, a correlation identifier (ID), or a MeNB general packet radio service (GPRS) tunneling protocol (GTP) tunnel endpoint ID (TEID).

12. The SeNB of claim 9, wherein the request message is a SeNB Addition Request message or a SeNB Modification Request message.

13. The SeNB of claim 9, wherein the information on the specific E-RAB includes at least one of E-RAB parameters for the specific E-RAB, or transport network layer (TNL) address information for the specific E-RAB.

14. The SeNB of claim 9, wherein the response message includes at least one of a X2 downlink (DL) general packet radio service (GPRS) tunneling protocol (GTP) tunnel endpoint, a SeNB GTP tunnel endpoint, or an indication for the specific E-RAB to be served by the L-GW.

15. The SeNB of claim 9, wherein the response message is a SeNB Addition Request Acknowledge message or a SeNB Modification Request Acknowledge message.

* * * * *